US009137391B2

(12) United States Patent
Miyagi (10) Patent No.: US 9,137,391 B2
(45) Date of Patent: Sep. 15, 2015

(54) INFORMATION PROCESSING APPARATUS, INFORMATION PROCESSING METHOD, AND STORAGE MEDIUM STORING PROGRAM

(75) Inventor: Arata Miyagi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 183 days.

(21) Appl. No.: 13/531,102

(22) Filed: Jun. 22, 2012

(65) Prior Publication Data

US 2013/0022292 A1   Jan. 24, 2013

(30) Foreign Application Priority Data

Jul. 22, 2011   (JP) ................................ 2011-161368

(51) Int. Cl.
*G06K 9/20* (2006.01)
*H04N 1/00* (2006.01)

(52) U.S. Cl.
CPC ....... *H04N 1/00137* (2013.01); *H04N 1/00145* (2013.01); *H04N 1/00164* (2013.01); *H04N 1/00167* (2013.01); *H04N 1/00188* (2013.01)

(58) Field of Classification Search
CPC ....... G06T 1/00; G06T 3/4038; G06T 3/4015; G06T 5/002; G06T 9/00; G06T 3/40; G06T 3/60
USPC .................... 382/286; 345/660; 715/767, 838
See application file for complete search history.

(56) References Cited

U.S. PATENT DOCUMENTS

| | | | | |
|---|---|---|---|---|
| 7,126,708 | B1* | 10/2006 | McConn et al. | 358/1.15 |
| 7,330,189 | B2* | 2/2008 | Nichogi et al. | 345/589 |
| 2005/0088684 | A1* | 4/2005 | Naito et al. | 358/1.15 |
| 2007/0291303 | A1* | 12/2007 | Tanaka et al. | 358/1.15 |
| 2008/0005767 | A1* | 1/2008 | Seo | 725/62 |
| 2008/0074444 | A1* | 3/2008 | Morikawa et al. | 345/660 |
| 2008/0134070 | A1* | 6/2008 | Kobayashi et al. | 715/767 |
| 2008/0170084 | A1* | 7/2008 | Miyazawa et al. | 345/660 |
| 2009/0007019 | A1* | 1/2009 | Kobayashi et al. | 715/838 |
| 2009/0310167 | A1* | 12/2009 | Sugimoto | 358/1.15 |
| 2011/0099251 | A1* | 4/2011 | Tsukada et al. | 709/219 |
| 2012/0218599 | A1* | 8/2012 | Kashioka | 358/1.15 |

FOREIGN PATENT DOCUMENTS

| | | |
|---|---|---|
| JP | 2001-350762 | 12/2001 |
| JP | 2004-192140 | 7/2004 |
| JP | 2008140361 A | 6/2008 |

OTHER PUBLICATIONS

Japanese Office Action issued May 11, 2015 during prosecution of related Japanese application No. 2011-161368.

* cited by examiner

*Primary Examiner* — Stephen R Koziol
*Assistant Examiner* — Shaghayegh Azima
(74) *Attorney, Agent, or Firm* — Fitzpatrick, Cella, Harper & Scinto (57) ABSTRACT

Size information indicating sizes of a plurality of images is acquired from at least one server. Based on the sizes of the plurality of images indicated by the acquired size information, an image having a size corresponding to an output performance of an output device used to output the plurality of images is selected as an image to be output to the output device.

13 Claims, 11 Drawing Sheets

```
<?xml version='1.0' encoding='UTF-8' ?>
<feed xmlns='http://www.w3.org/2005/Atom' xmlns:photo='http://schemas.A.com>
<totalResults>10</totalResults>
<user>annkodaisuki</user>
<maxPhotosPerAlbum>1000</maxPhotosPerAlbum>

<entry>
<published>2009-12-02T08:00:00.000Z</published>
<id>54105012691627471 69</id>
<media:content url='http://lh3.A.com/_h3Nnl4upTHI/SxX2PP0-
5SE/AAAAAAAABDY/dsmG_pKdi2Q/Sizetest.jpg' type='image/jpeg' medium='image'/>
<media:thumbnail url='http://lh3.A.com/_h3Nnl4upTHI/SxX2PP0-
5SE/AAAAAAAABDY/dsmG_pKdi2Q/s160-c/Sizetest.jpg' height='160' width='160'/>
</entry>

<entry>
 :
</entry>

<entry>
 :
</entry>
```

```
<?xml version="1.0" encoding="UTF-8"?>
<feed xmlns="http://www.w3.org/2005/Atom"
xmlns:photo="http://schemas.A.com/A">
 <user>annkodaisuki</user>
 <entry>
  <published>2009-12-02T08:00:00.000Z</published>
  <content url="https://lh3.A.com/_S0OcD5EJ-
DA/TMj6f18shOI/AAAAAAAAARw/luWm8IIXNFE/1000.JPG"
height="1200" width="1600" type="image/jpeg"
medium="image"></content>
  <thumbnail url="https://lh3.A.com/_S0OcD5EJ-
DA/TMj6f18shOI/AAAAAAAAARw/luWm8IIXNFE/s72/1000.JPG"
height="54" width="72"></thumbnail>
  <thumbnail url="https://lh3.A.com/_S0OcD5EJ-
DA/TMj6f18shOI/AAAAAAAAARw/luWm8IIXNFE/s144/1000.JPG"
height="108" width="144"></thumbnail>
  <thumbnail url="https://lh3.A.com/_S0OcD5EJ-
DA/TMj6f18shOI/AAAAAAAAARw/luWm8IIXNFE/s288/1000.JPG"
height="216" width="288"></thumbnail>
  <thumbnail url="https://lh3.A.com/_S0OcD5EJ-
DA/TMj6f18shOI/AAAAAAAAARw/luWm8IIXNFE/s512/1000.JPG"
height="384" width="512"></thumbnail>
 </entry>
 <entry>
   :
 </entry>
 <entry>
   :
 </entry>
 <entry>
   :
 </entry>
 <entry>
   :
 </entry>
   :
</feed>
```

F I G. 11

```
<?xml version="1.0" encoding="UTF-8"?>
<feed xmlns="http://www.w3.org/2005/Atom"
xmlns:photo="http://schemas.B.com/A">
 <user>annkodaisuki</user>
 <entry>
   <published>2009-12-02T08:00:00.000Z</published>
   <content url="https://lh3.B.com/_S0OcD5EJ-
DA/TMj6f18shOI/AAAAAAAAARw/IuWm8IIXNFE/1000.JPG"
height="1200" width="1600"
type="image/jpeg" medium="image"></content>
   <thumbnail url="https://lh3.B.com/_S0OcD5EJ-
DA/TMj6f18shOI/AAAAAAAAARw/IuWm8IIXNFE/s/1000.JPG"
width="100"></thumbnail>
   <thumbnail url="https://lh3.B.com/_S0OcD5EJ-
DA/TMj6f18shOI/AAAAAAAAARw/IuWm8IIXNFE/l/1000.JPG"
width="512"></thumbnail>
 </entry>
 <entry>
  :
 </entry>
 <entry>
  :
 </entry>
 <entry>
  :
 </entry>
 <entry>
  :
 </entry>
  :
</feed>
```

INFORMATION PROCESSING APPARATUS, INFORMATION PROCESSING METHOD, AND STORAGE MEDIUM STORING PROGRAM

BACKGROUND OF THE INVENTION

1. Field of the Invention

The present invention relates to an information processing apparatus for selecting an output target image, an information processing method, and a storage medium storing a program.

2. Description of the Related Art

In recent years, a server connected to the Internet provides a Web service which allows users to open and share photo images with each other. With this Web service, each user can display photo images, and can upload image data such as photos on a Web browser which runs on a PC or the like.

A Web service which provides an API (Application Program Interface) which allows the user to directly acquire information stored in a Web server from an application is available. Then, an embedded device which incorporates software that allows to display image data on the server using such API has been developed.

Note that the Web service stores thumbnail image data each having the smaller number of pixels than high-resolution main images in addition to the main images. Then, the embedded device acquires and displays thumbnail images from the Web server, thus presenting image contents to the user earlier than when main images are displayed.

As a method of displaying thumbnail images, Japanese Patent Laid-Open No. 2008-140361 describes a method of storing a plurality of types of thumbnail images having different numbers of pixels. Then, as described in this literature, thumbnail images having the number of pixels according to a display magnification designated by the user are displayed on a thumbnail image list view screen.

The above related art displays images having the number of pixels according to the display magnification, but does not consider a display device which displays the images. Therefore, even when images having the number of pixels according to the display magnification are displayed on a display device, these images often do not match that display device. For example, even the number of pixels of images, which is selected according to the display magnification designated by the user, is suited to display these images on a display device having a certain resolution, but it is often not suited to a display device having a resolution lower than that display device.

SUMMARY OF THE INVENTION

An aspect of the present invention is to eliminate the above-mentioned problems with the conventional technology. The present invention provides an information processing apparatus which allows the user to select appropriate image data according to an output device which is used to output an image as an output target, an information processing method, and a storage medium storing a program.

The present invention in its first aspect provides an information processing apparatus comprising: an acquisition unit configured to acquire size information indicating sizes of a plurality of images from a server; and a selection unit configured to select an image having a size corresponding to an output performance of an output device used to output the plurality of images, from the plurality of images as an image to be output to the output device based on the respective sizes of the plurality of images indicated by the size information acquired by the acquisition unit.

The present invention in its second aspect provides an information processing method comprising: acquiring size information indicating sizes of a plurality of images from a server; and selecting an image having a size corresponding to an output performance of an output device used to output the plurality of images, from the plurality of images as an image to be output to the output device based on the respective sizes of the plurality of images indicated by the acquired size information.

The present invention in its third aspect provides a computer-readable storage medium storing a program for controlling a computer to execute:acquiring size information indicating sizes of a plurality of images from a server; and selecting an image having a size corresponding to an output performance of an output device used to output the plurality of images from the plurality of images as an image to be output to the output device based on the respective sizes of the plurality of images indicated by the acquired size information.

According to the present invention, appropriate image data can be selected as an output target according to an output device used to output an image.

Further features of the present invention will become apparent from the following description of exemplary embodiments with reference to the attached drawings.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same components throughout the drawings, and a description thereof will not be given.

Figure 1:
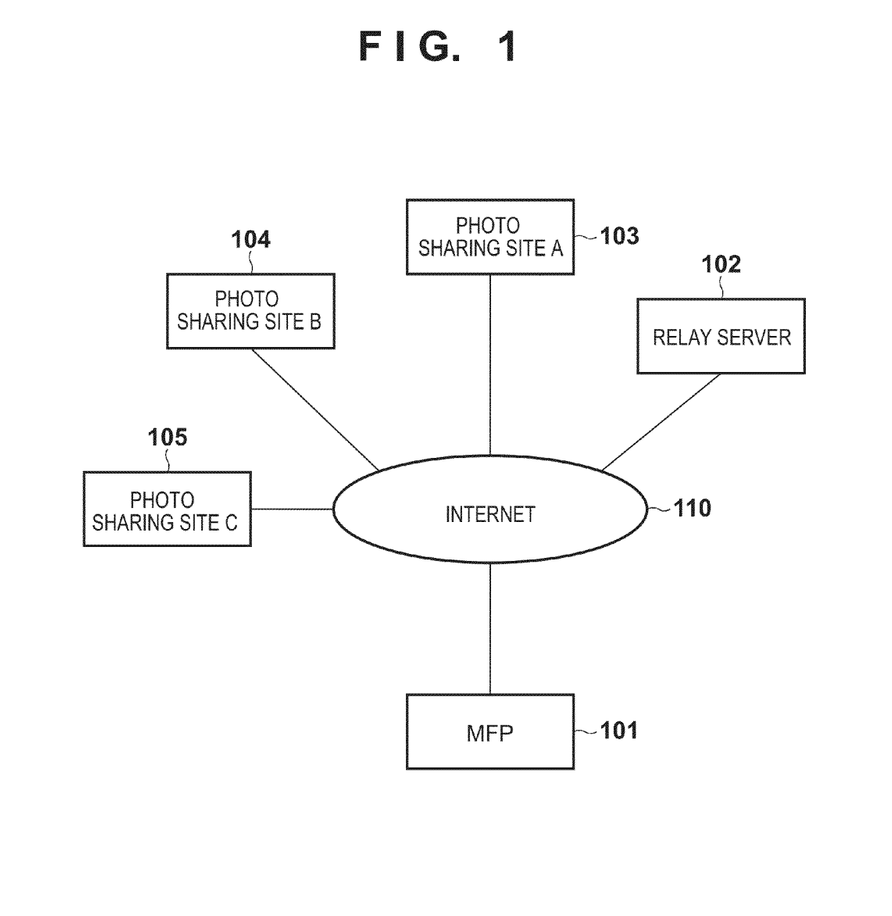
FIG. 1 is a block diagram showing the arrangement of a Web service system.

FIG. 1 is a block diagram showing the network arrangement including an information processing apparatus according to an embodiment of the present invention. A network shown in FIG. 1 is a part of the Internet which is interconnected using the TCP/IP. In this network, an MFP (Multifunctional Peripheral) 101 as a client device, a relay server 102, and a photo sharing site server (to be referred to as a photo sharing site or simply as a site hereinafter) 103 are connected and can exchange data via mutual communications. Also, many other computers and devices (not shown) may be connected.

The user can create an environment required to connect the MFP 101 to the Internet by subscribing to an ISP (Internet Service Provider). For example, the MFP 101 can communicate with the relay server 102 and photo sharing site 103. A router (not shown) may be connected between the MFP 101 and Internet. In order to designate a server or image file on the Internet, a URL may be used. In this embodiment, location information on the network can be designated by a URL.

In the network arrangement shown in FIG. 1, the MFP 101 can transmit images to the server and can store them in a memory in the server without the intervention of any PC according to location information of each of photo sharing sites 103 to 105. At this time, the memory of each of the image sharing sites 103 to 105 stores main images each having the large number of pixels and thumbnail images each of which has the same contents as the main image and has the number of pixels smaller than the main image.

The MFP 101 can acquire images from the photo sharing site without the intervention of any PC according to location information required to specify a server and image files, and can display the acquired images on its display screen. As the display contents, a selection screen which allows the user to select, for example, an album/image data can be displayed. Since this selection screen need only allow the user to confirm the contents of images as selection target candidates, thumbnail images stored in the server may be acquired.

When the user selects an image on the selection screen, the MFP 101 acquires that image from the server, and outputs the acquired image. As an output method, for example, a main image is output to a printing device to print that image. In such arrangement, image data such as a photo stored in the server tends to have a larger data size with increasing the number of pixels, and requires a longer transfer time to the MFP 101. Especially, the size of an image to be provided to the client device may often be changed as a result of specification changes on the Web service side. At this time, when the size of an image is changed to be larger, the transfer time is prolonged, or the image fails to be transferred.

On the other hand, when an output device such as a display device which is controlled by a client device to display an image or a printing device which is controlled by the client device to print an image outputs an image, the appropriate number of pixels of an image as an output target depends on the performance of the output device. For example, when the client device acquires an image having the very large number of pixels, and displays it on the display device, even when that image is acquired by taking a very long transfer time, the display device having a low resolution often has to display the acquired image by decimating pixels. Especially, a display unit of an embedded device normally has a smaller area and the smaller number of displayable pixels than a PC. For this reason, when such device acquires image data having the number of pixels considerably larger than that of the display unit, a very long transfer time is required, and improvement of display quality cannot be expected.

Hence, in this embodiment, when the MFP 101 as the client device acquires an image from the photo sharing site and outputs the acquired image to an output device, it is controlled to output an image according to the performance of the output device to which that image is output. Especially, in this embodiment, the photo sharing site stores a plurality of images which have the same contents but different numbers of pixels. Then, an image according to the performance of the output device is selected from the plurality of images. This embodiment will be described in more detail below.

Figure 2:
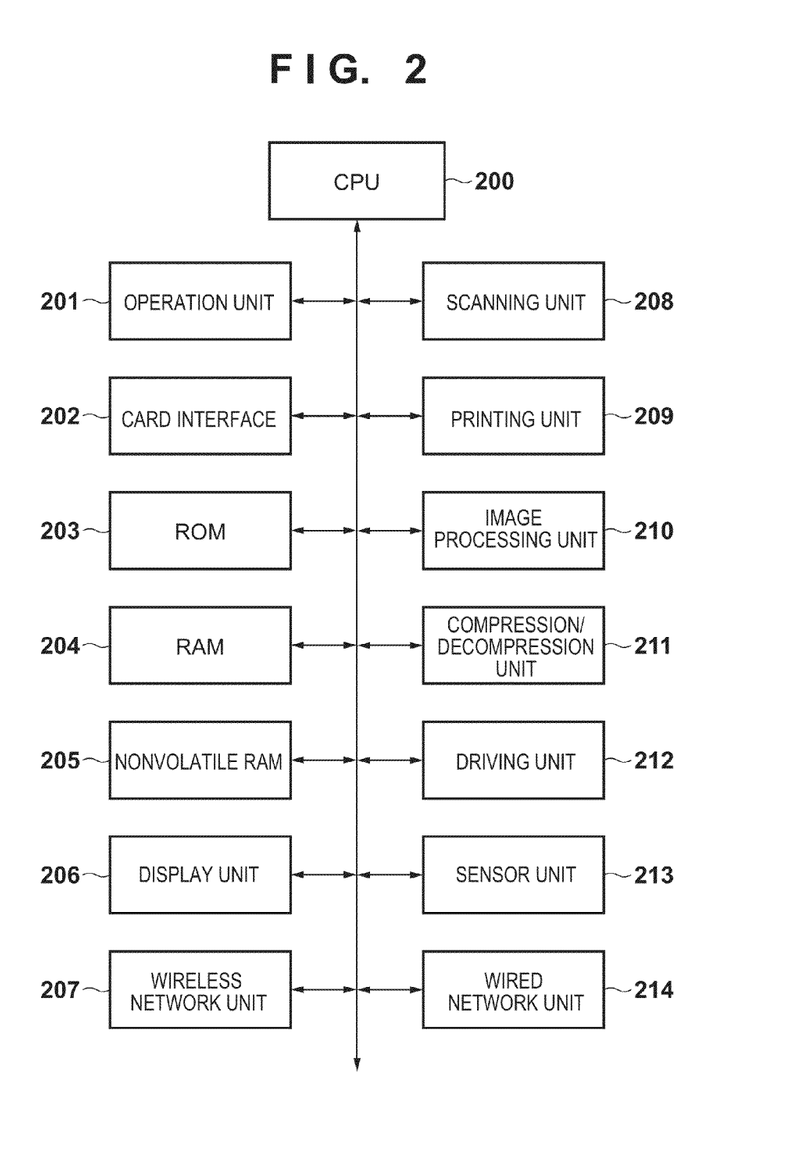
FIG. 2 is a block diagram showing the hardware arrangement of an MFP.

FIG. 2 is a block diagram showing the hardware arrangement of the MFP 101. The MFP 101 has an operation unit 201, card interface 202, scanning unit 208, and printing unit 209. Also, the MFP 101 has a CPU 200, ROM 203, RAM 204, nonvolatile RAM 205, display unit 206, image processing unit 210, compression/decompression unit 211, driving unit 212, and sensor unit 213. The CPU 200 controls the overall MFP 101, and executes a program stored in the ROM 203 according to, for example, a user operation input via the operation unit 201. The ROM 203 stores a control instruction program and the like of the MFP 101. Furthermore, the MFP 101 has a wireless network unit 207 and a wired network unit 214. The wireless network unit 207 can wirelessly communicate with a wireless LAN access point which is compliant with, for example, the IEEE802.11a standards. The wired network unit 214 has an Ethernet® connector which can connect, for example, a 100Base-TX twisted pair cable.

With the aforementioned arrangement, the MFP 101 can communicate with the relay server 102 using the wireless network unit 207 or wired network unit 214, and can access the photo sharing sites 103 to 105 via the relay server 102. After an image is acquired from the photo sharing sites 103 to 105, the MFP 101 can control the display unit 206 to display that image or can control the printing unit 209 to print that image on a print medium. Note that the image need not be displayed or printed by the display unit 206 or printing unit 209, but it may be displayed or printed by an external display device or printing device of the MFP 101.

Each of the relay server 102 and sites 103 to 105 shown in FIG. 1 adopts the arrangement of a general PC or the like. That is, each of the relay server 102 and sites 103 to 105 has a CPU, a ROM, a RAM, an HDD, a display unit such as a display, and an input unit such as a pointing device and keyboard as the general arrangement of the PC. For example, in each of these servers, the CPU expands a program loaded from the HDD, ROM, or the like on the RAM, and executes the expanded program. The HDD stores programs required to implement processes shown in various flowcharts and image data. The display displays a user interface and the like, and the user makes operations on the user interface using the pointing device, keyboard, or the like, thus inputting various instructions.

In order to acquire information of each site, the MFP 101 issues a request by APIs with the relay server 102 using HTTP POST communications irrespective of any API of that site. The APIs between the relay server 102 and MFP 101 are defined as follows:

API-R1 (condition check): a function of confirming destination information of the MFP 101 and connectable sites from which services by means of IP addresses can be received on the Internet;

API-R2 (login authentication): a function of determining whether or not to allow authentication with the sites;

API-R3 (album list request): an acquisition function of all pieces of album information; and API-R4 (image list request): an acquisition function of image information registered in each album.

The MFP 101 receives an information list, which is requested to the site designated by the user, from the relay server 102. The MFP 101 specifies a URL for display image data from a corresponding part of the information list received from the site, and acquires the display image data according to that URL. That is, the MFP 101 acquires authentication information and the information list via the relay server 102, and directly acquires, from the site, data such as image data which can be directly acquired by designating a URL.

Figure 3:
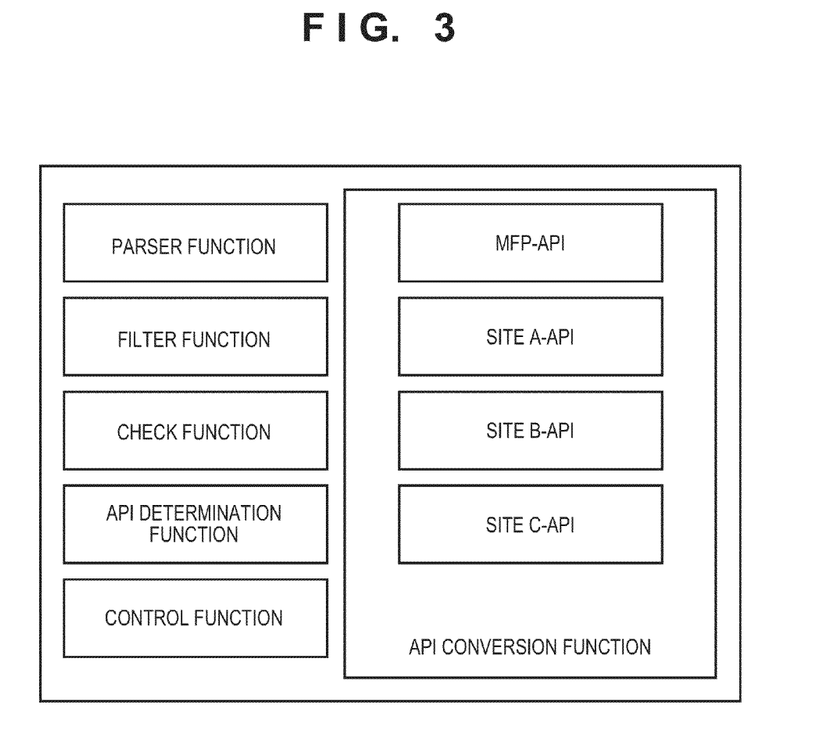
FIG. 3 is a diagram showing the application configuration of a relay server.

FIG. 3 shows the application configuration of the relay server 102. In this embodiment, a main function of the relay server 102 is an API conversion function. The relay server 102 defines an "MFP-API" with the MFP 101. The relay server 102 API-converts the API configuration defined with the MFP 101 into those ("site A-API", "site B-API", and "site C-API") defined with the respective sites 103 to 105 as connection destinations.

Respective functions of the relay server 102 will be described below with reference to FIG. 3. The relay server 102 has the following functions. Note that in the relay server 102, programs corresponding to these functions are stored in the ROM, and the respective functions shown in FIG. 3 can be implemented when the CPU of the relay server 102 executes the programs stored in the ROM.

Figure 5:
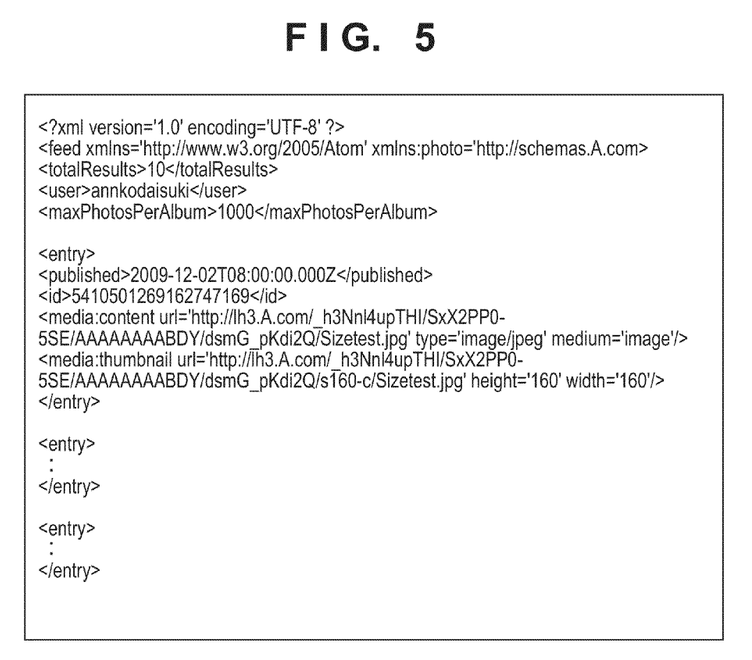
FIG. 5 shows a description example of an album list.

Parser function: This function parses, using a parser, an XML list from each site, as shown in FIG. 5.

Filter function: This function deletes data other than information to be transmitted to the MFP 101 from those received from each site. For example, this function deletes expired contents, file types other than designated file types, image data having file sizes equal to or larger than an upper limit, and the like.

Check function: In response to a condition check request from the MFP 101, this function checks whether or not each site is connectable based on an IP address of the MFP 101 and information transmitted from the MFP 101.

API determination function: This function compares API use counts for respective sites. For example, upon reception of an information request from the MFP 101, this function compares API use counts required to acquire that information for respective sites.

Control function: This function distributes sites to be designated based on destination information of the MFP 101.

API communications among the MFP 101, relay server 102, and sites 103 to 105 in this embodiment will be described below. The API communications are executed in the following sequence. That is, the MFP 101 executes the condition check API to determine connectable sites. The MFP 101 selects one from the available sites, and the user inputs account information and a password required to connect a personal album, so as to establish a connection to that site. The MFP 101 executes authentication by means of the API-R2 for authentication confirmation, thus confirming whether or not the connection is normally established. After that, the MFP 101 acquires album information so as to specify image data that the user wants to print of those personally registered by that user, and the user selects a desired album. Then, the MFP 101 specifies image data registered in the desired album to acquire and print the image data.

The sequence of the aforementioned processing will be described below with reference to FIGS. 7 and 8. At this time, assume that each site stores thumbnail images as images to be displayed, and main images each having the larger number of pixels than the thumbnail images as images to be printed. This thumbnail image is stored together with a main image when the client device uploads an image to the site. Alternatively, the photo sharing site server may generate a thumbnail image by decimating pixels of a main image acquired from the client device.

Figure 7:
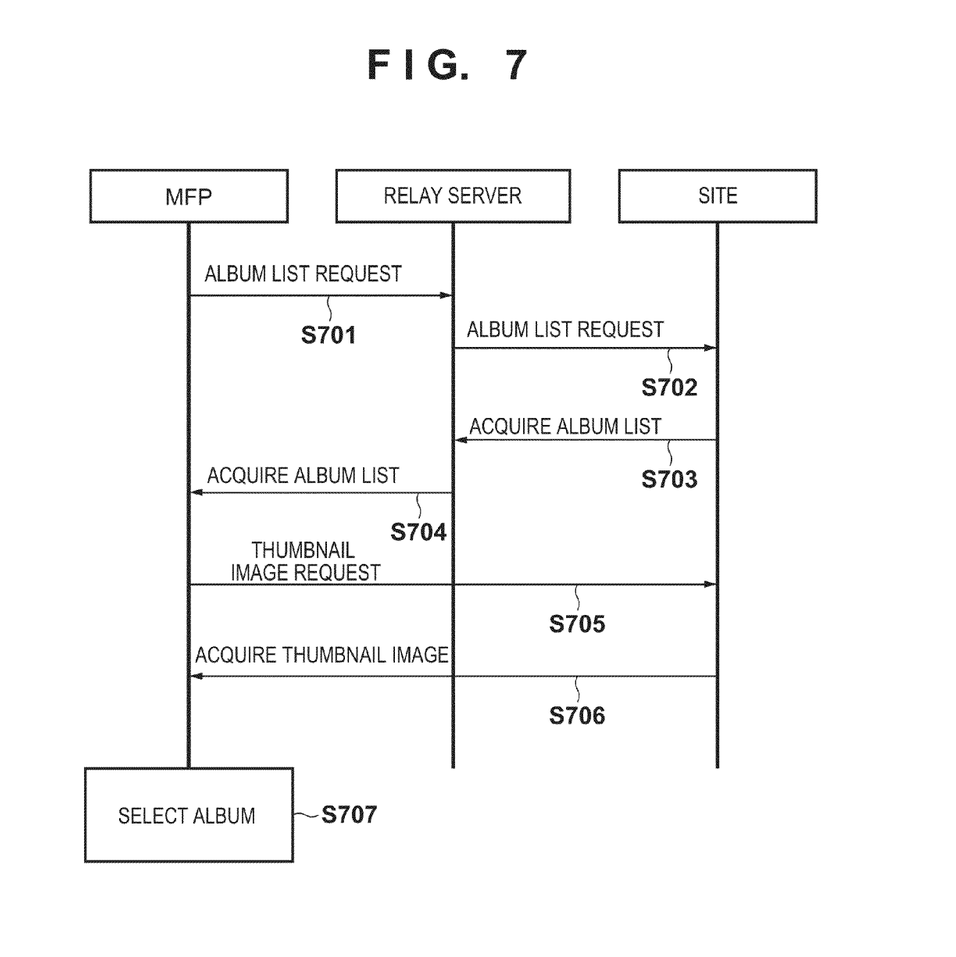
FIG. 7 is a chart showing the sequence of processing from when an album list is acquired until it is displayed.

FIG. 7 is a chart showing the sequence of processing until an album list is acquired and displayed. The MFP 101 issues an album list request to the relay server 102 using the API-R3 (S701). The relay server 102 interprets that request and issues an API request according to the request destination site by the API conversion function (S702). The request destination site returns an album list to the relay server 102 in response to that request (S703). Different API configurations are used in steps S702 and S703 depending on the sites. The relay server 102 receives the album list in a description format shown in, for example, FIG. 5. The relay server 102 parses the XML and returns the album list to the MFP 101 (S704).

The MFP 101 directly issues an HTTP Get request to the site based on the received album list (S705). Then, the MFP 101 receives thumbnail images from that site (S706), and displays a selection screen of albums on its display screen. The user selects a desired album to be displayed from the displayed album selection screen (S707). Alternatively, every time the user switches an album to be selected, the processes in steps S705 and S706 may be executed.

Figure 8:
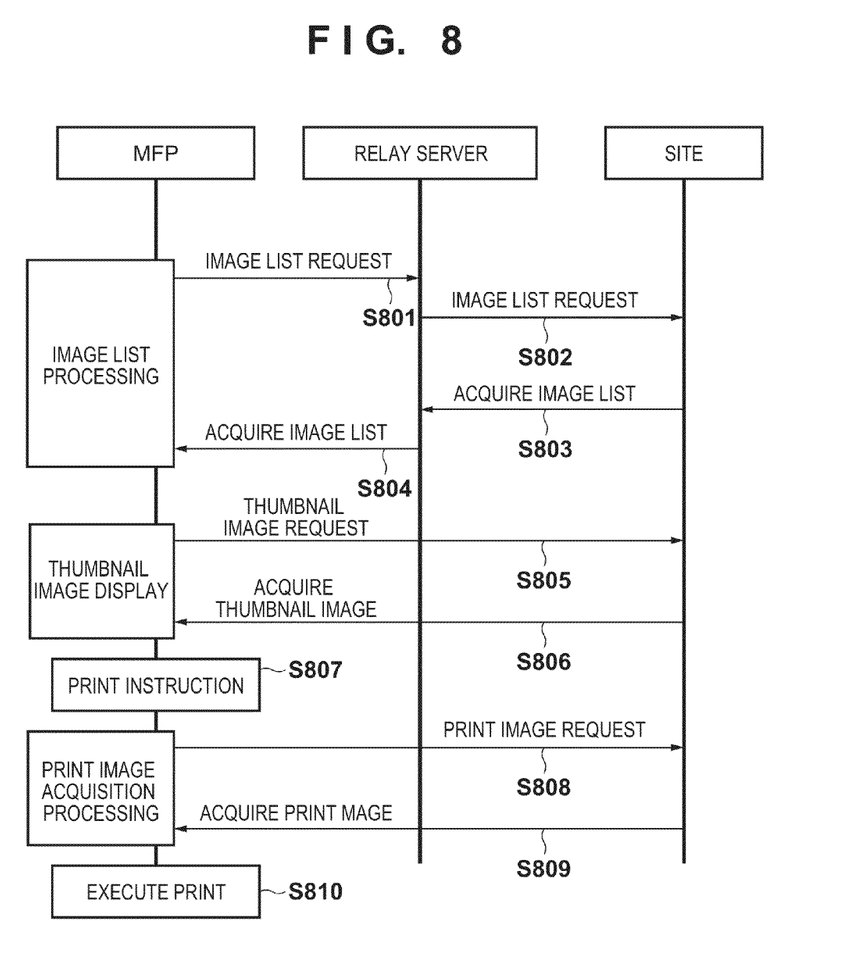
FIG. 8 is a chart showing processing from when a print target image is selected until it is printed.

FIG. 8 is a chart showing processing until an image to be printed is specified and printed after the processing shown in FIG. 7. The MFP 101 issues the API-R4 to the relay server 102 so as to request album images (S801). The relay server 102 interprets that request to convert it into an API configuration according to the request destination site by the API conversion function, and issues the converted API to the request destination site (S802). In response to this request, the site returns an image list of images in the album designated by the user to the relay server 102 (S803). Different API configurations are used in steps S802 and S803 depending on the sites. The relay server 102 receives the image list in the description format shown in, for example, FIG. 5. The relay server 102 parses the XML and returns the image list to the MFP 101 (S804).

The MFP 101 acquires URL information and the like of thumbnail images from the received image list, and directly issues an HTTP Get request to the site (S805). Then, the MFP 101 receives thumbnail images from that site (S806), and displays a selection screen of images on its display screen. The user selects a desired image from the displayed image selection screen (S807). Alternatively, every time the user switches an image to be selected, the processes in steps S805 and S806 may be executed. After the user selects the desired image and inputs a print instruction, the MFP 101 directly issues an HTTP Get request to the site so as to acquire image data to be printed (S808), and receives the image data to be printed from the site (S809). The MFP 101 expands the received image data to be printed, and prints it on a print medium (S810).

A photo sharing site function as a Web service will be described below. The photo sharing site function provided as a Web service by each of the sites 103 to 105 is mainly premised on browsing using a browser on a PC. The user acquires an account, registers that account and a password as a set, and then uses the Web service.

Figure 4:
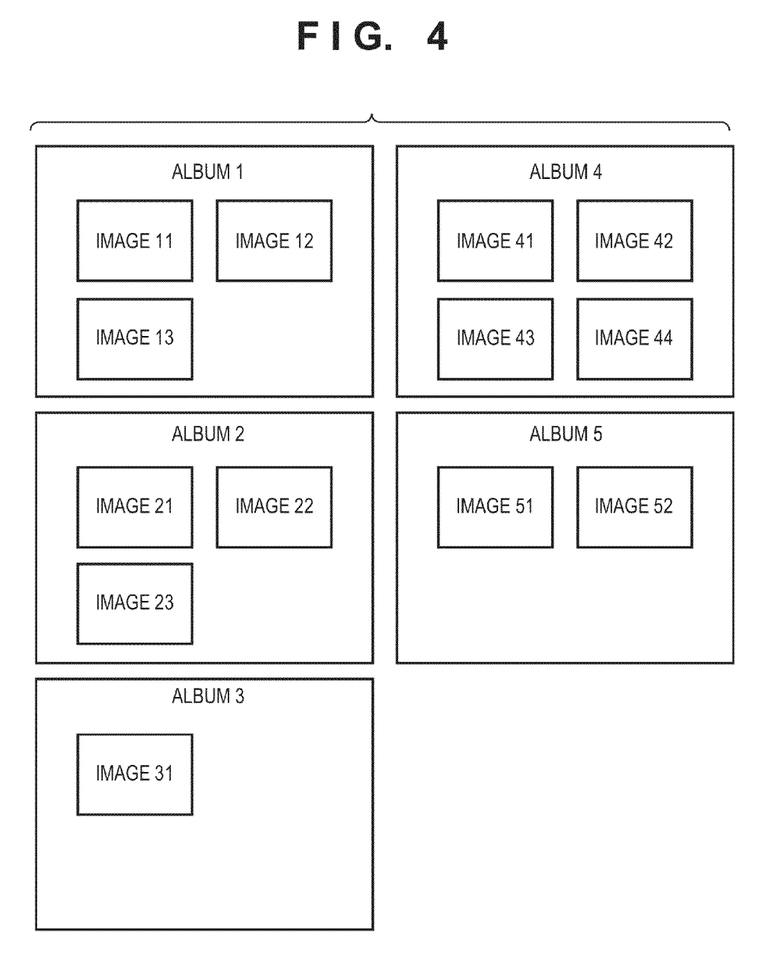
FIG. 4 is a view showing an example of the data configuration registered in each site.

FIG. 4 shows an example of the data configuration registered by each of the sites 103 to 105 in association with the photo sharing site function. Images registered in each of the sites 103 to 105 are combined as units called albums. For example, as shown in FIG. 4, five albums are registered in each site. Three images are registered in each of albums 1 and 2. One image is registered in album 3, four images are registered in album 4, and two images are registered in album 5.

Furthermore, each album includes an album title, album registration date, and the like in addition to a thumbnail image which represents that album, and is displayed on a browser required to use the photo sharing site function. When the user selects one album from the displayed album list, he or she can browse one or more images registered in the selected album.

The aforementioned photo sharing site function can be used not only from a browser on a PC. For example, using the published APIs of the sites 103 to 105, an apparatus (MFP or the like) other than that which installs a browser can use Web services.

FIG. 5 shows a description example of the album list which is acquired by the relay server 102 from one of the sites 103 to 105 using the API. The album list is described using, for example, XML. As shown in FIG. 5, it can be confirmed from a tag "<totalResults>" that the number of albums is 10. As information of each album, an image URL, thumbnail image URL, ID, photographing date, and the like are described for each tag "<entry>".

Figure 10:
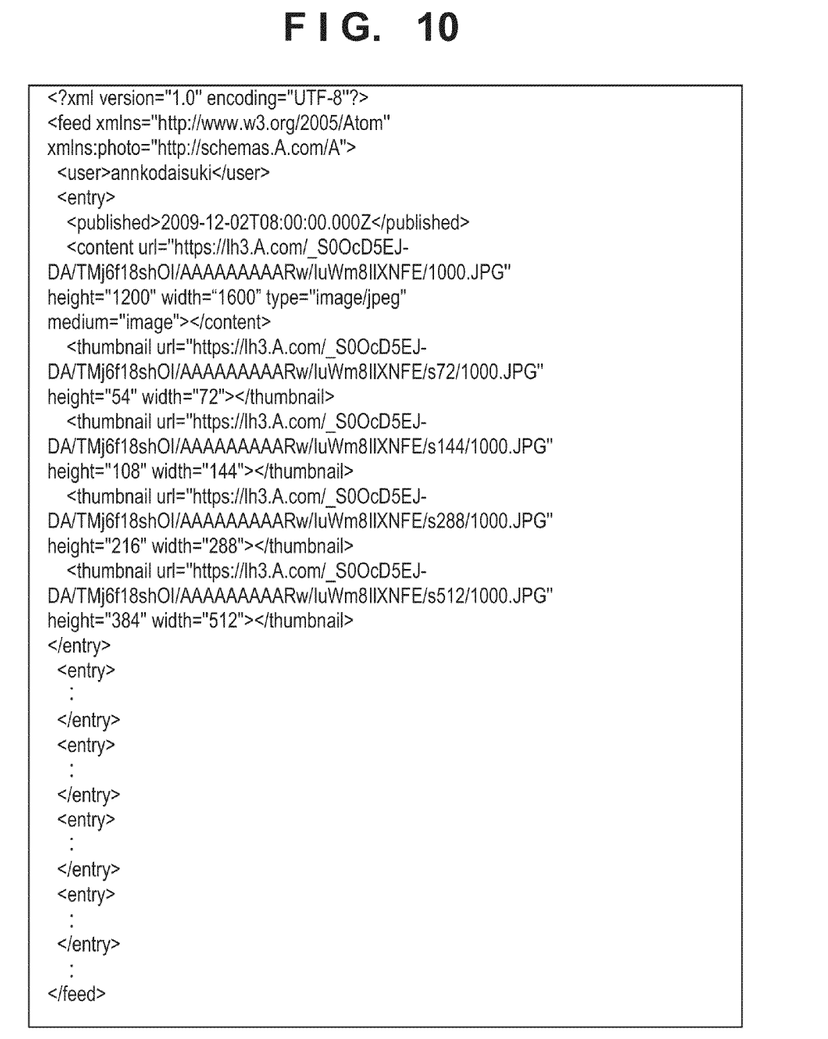
FIG. 10 shows an example of an image information list acquired by the relay server.
Figure 11:
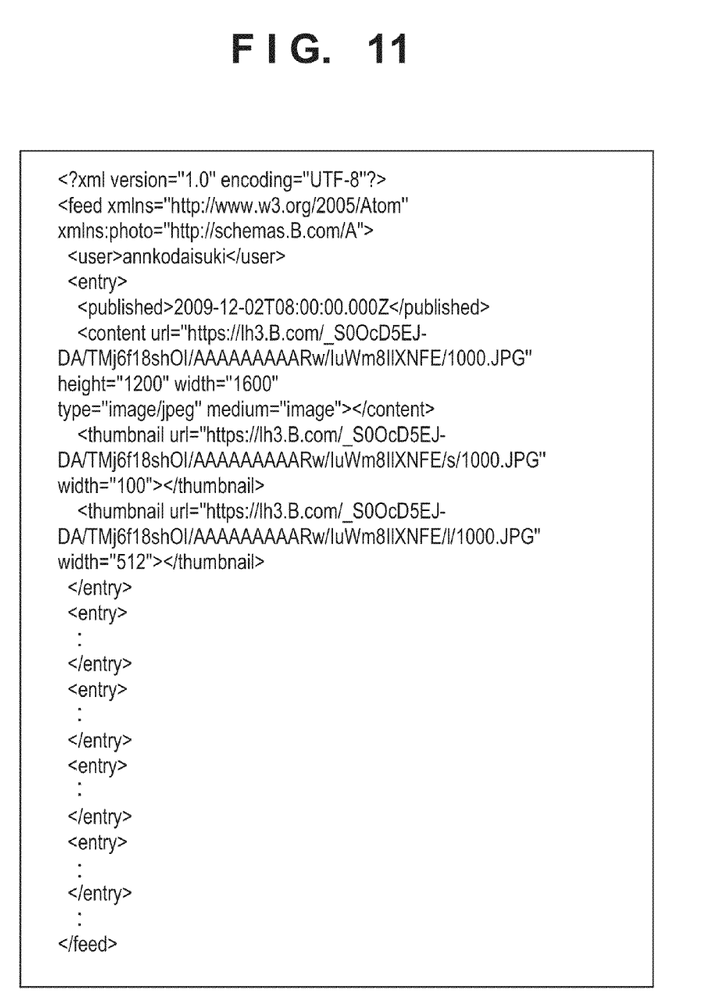
FIG. 11 shows another example of the image information list acquired by the relay server.

FIGS. 10 and 11 show a description example of the image list, which is acquired by the relay server 102 from one of the sites 103 to 105 using the API. In each of the sites 103 to 105, together with image data of a main image, at least one thumbnail image corresponding to that main image is stored. At this time, a plurality of thumbnail images having different numbers of pixels may be stored.

For example, as shown in FIG. 10, size information (height=1200 pixels, width=1600 pixels) of main image data at the site A is described in each <content> tag. Also, for example, URLs of four thumbnail image data having (width, height)=(72, 54), (144, 108), (288, 216), and (512, 384) are described. Width and height units in this case are "pixels".

Figure 6:
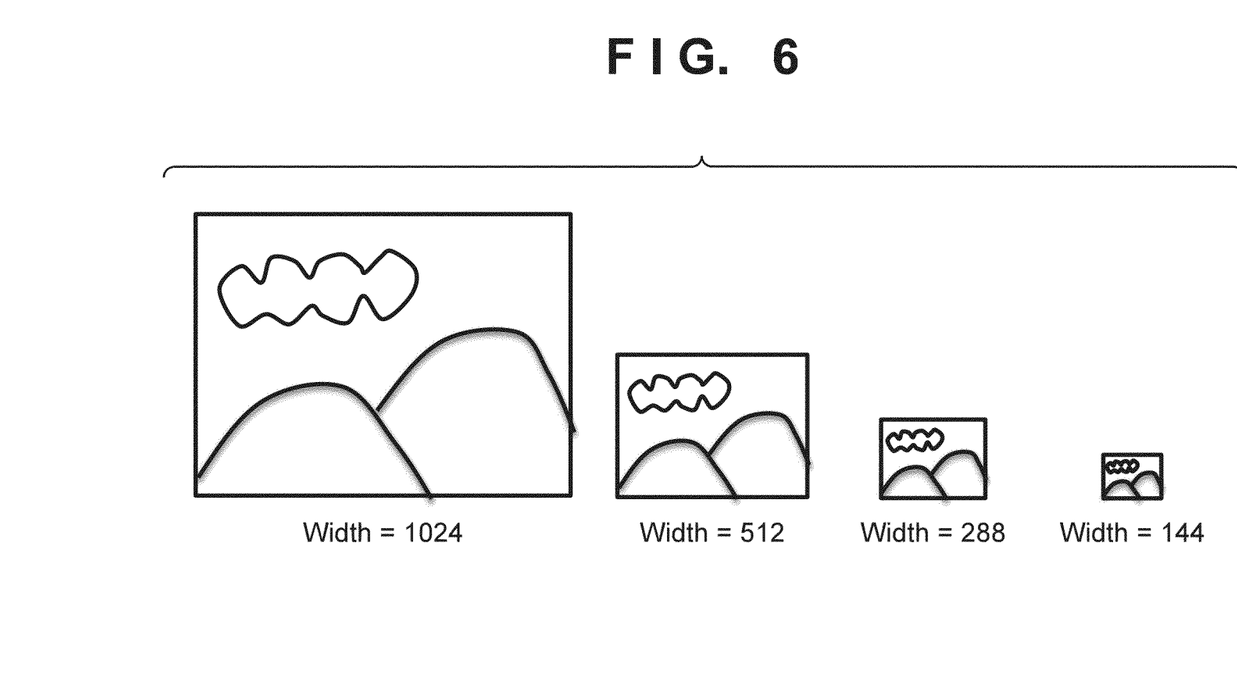
FIG. 6 is a view showing examples of thumbnail images which can be acquired from a photo sharing site A.

FIG. 6 shows an example of thumbnail images which can be acquired from the photo sharing site A. As shown in FIG. 6, images respectively having widths of 1024 pixels, 512 pixels, 288 pixels, and 144 pixels are stored, and the MFP 101 can acquire these images from the photo sharing site 103 by designating URLs described in <thumbnail> tags. Note that the thumbnail images shown in FIG. 6 are generated by reducing a main image in size by the photo sharing site 103. However, various client devices such as a digital cameras may generate thumbnail images and may upload them to the photo sharing site A.

In this embodiment, assume that at the photo sharing site B, two thumbnail image data are defined per main image data. In this case, for example, two thumbnail image data having widths of 512 pixels and 100 pixels are defined. Also, assume that the MFP 101 cannot acquire the height size of each thumbnail image unlike in the site A.

In this embodiment, assume that the photo sharing site C has a data configuration similar to the site A. However, the API configurations between the relay server 102 and site A are different from those between the relay server 102 and site C, and they have no compatibility.

Figure 9A:
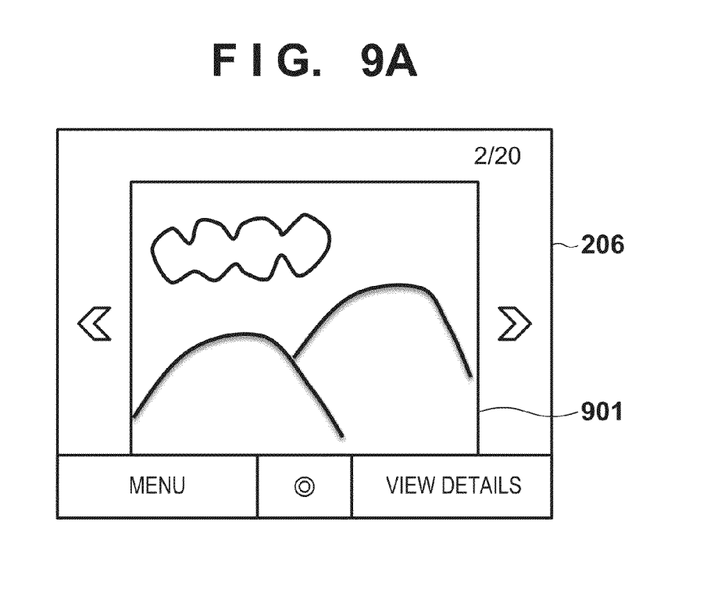
FIGS. 9A and 9B are views showing a screen of a display unit of the MFP.
Figure 9B:
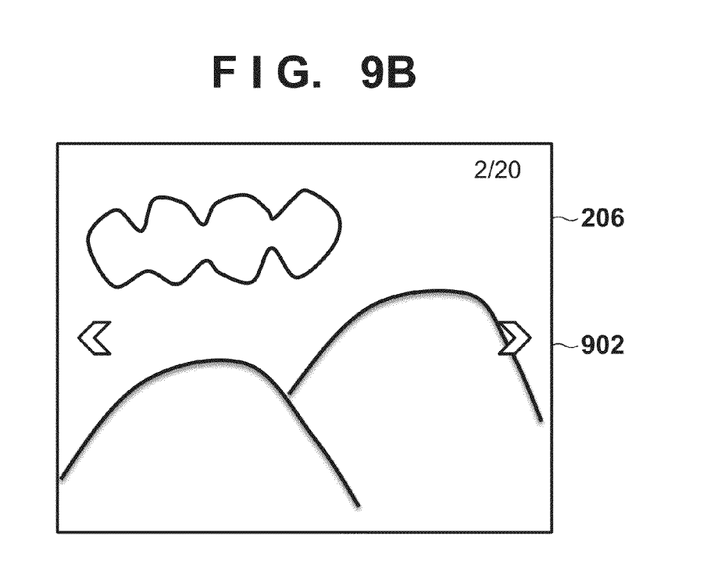

FIGS. 9A and 9B show the screen of the display unit 206 of the MFP 101. The display unit 206 is, for example, a matrix type color liquid crystal device. The display unit 206 can display 320 pixels in the horizontal direction and 240 pixels in the vertical direction, and can attain 65536 different color expressions by combining three, R, G and B color tones and expressing them by 16 bits for respective pixels. The display unit 206 has a partial display mode using a part of the screen as an image display area, as shown in FIG. 9A, and also has a full-screen display mode using the entire screen as an image display area, as shown in FIG. 9B. An image display area 901 in the partial display mode has a width of 240 pixels and a height of 180 pixels. An image display area 902 in the full-screen display mode has a width of 320 pixels and a height of 240 pixels. The user can switch the full-screen display mode and partial display mode by operating the operation unit 201.

The image display areas are not limited to those switched by the partial display mode and full-screen display mode. For example, an index display mode for displaying and arranging a plurality of images on the display screen may be used. In this case, the size of a display area assigned to one image on the display screen is that of an image display area.

The operations of the MFP 101 and relay server 102 in association with the image list request by the "API-R4" according to this embodiment will be described below with reference to FIG. 8.

An album image acquisition request issued by the MFP 101 in step S801 in FIG. 8 includes a parameter indicating an image display area of the MFP 101. In this embodiment, the MFP 101 transmits, to the relay server 102, "UI_Large" in case of the full-screen display mode or "Ui_Middle" in case of the partial screen display mode as a parameter which represents the display performance upon issuing the image acquisition request. Upon reception of the parameter which represents the image display area, the relay server 102 decides the size (display size) of thumbnail images to be acquired by the MFP 101 with reference to a predetermined database. The database stores a table which associates parameters transmitted from the MFP 101 with sizes of the image display areas, and the like. The MFP 101 notifies the relay server 102 of the sizes (the numbers of pixels) of the image display areas to be stored in this database, and the notified sizes of the image display areas are registered in the database. After registration in the database, when the aforementioned parameter is received from the MFP 101, the size of the image display area on the display device can be determined without receiving the size of the image display area. At this time, in the database, the aforementioned tables are prepared for respective display devices. Then, in step S801, information indicating a display device type is also transmitted from the MFP 101 to the relay server 102, and the size of the image display area is specified from the table according to the display device type indicated by that information.

However, such database may not be provided. In this case, every time an image list request is issued in step S801, the size (the number of pixels) of the image display area on the display screen is transmitted to the relay server as the display performance of the display device. This database stores a table which associates the sizes of the image display areas with those of thumbnail images. With reference to this table, thumbnail images are decided in accordance with the size of the image display area, which is specified, as described above.

A case will be described below wherein the site A is selected as the photo sharing site. When the relay server 102 receives "UI_Middle" as the parameter which represents the image display area, it judges that the image display area on the display screen has a width of 240 pixels and a height of 180 pixels, as shown in FIG. 9A. Then, the relay server 102 selects thumbnail image data having a width of 288 pixels of those stored in the site A shown in FIG. 6. Since there are a plurality of thumbnail image sizes, which can be acquired, for each site, the relay server 102 selects thumbnail images having a size closest to that of the image display area from these images.

Alternatively, the relay server 102 may select images having a largest size of those which have sizes smaller than the image display area. At this time, the selected images are enlarged to fit the size of the image display area. In this way, compared to a case in which images having a size larger than that of the image display area, a transfer time required to acquire images from the server can be shortened. Since images having a largest size of those having sizes smaller than the image display area are acquired, a low enlargement factor upon enlarging the images can be set. Thus, the influence of image quality deterioration due to enlargement of images can be reduced.

Furthermore, images having a smallest size of those having sizes larger than the image display area may be selected. At this time, the images are reduced to fit the size of the image display area. Upon comparing image deterioration degrees caused by image enlargement and image reduction, since image enlargement requires to supplement pixels, it readily causes deterioration compared to the reduction processing. As described above, since images having a size larger than the image display area are acquired, they need not be enlarged, thus suppressing image quality deterioration.

The relay server 102 receives the image information list shown in, for example, FIG. 10, in step S803, and parses the XML using the parser function. As a result of the XML parsing, the relay server 102 acquires URLs of image data respectively having different widths of 512 pixels, 288 pixels, 144 pixels, and 72 pixels as thumbnail image data that can be acquired (data acquisition). Then, based on the parameter (in this case, "Ui_Middle", that is, a width of 240 pixels) included in the image acquisition request received in step S801, the relay server 102 selects thumbnail image data of 288 pixels which are closest to that size. Then, the relay server 102 transmits a response including a URL of image data having the width of 288 pixels to the MFP 101 in step S804.

A case will be described below wherein the site B is selected as the photo sharing site. In the site B, two types of thumbnail image data having widths of 512 pixels and 100 pixels are defined, as described above. When the relay server 102 receives "UI_Middle" as the parameter indicating the image display area, it selects thumbnail image data having a width of 100 pixels when the site B is a target.

The relay server 102 receives the image information list shown in, for example, FIG. 11, in step S803, and parses the XML using the parsing function. As a result of the XML parsing, the relay server 102 acquires URLs of image data having widths of 512 pixels and 100 pixels as thumbnail image data which can be acquired. Then, based on the parameter (the width of 240 pixels in the same manner as the above case) included in the image acquisition request received in step S801, the relay server 102 selects thumbnail image data having the width of 100 pixels, which are closest to that size. Then, the relay server 102 returns a response including a URL indicating image data having the width of 100 pixels to the MFP 101 in step S804.

In this embodiment, the database of the relay server 102 stores sizes of thumbnail images to be acquired by the MFP 101. Alternatively, the sizes of thumbnail images to be acquired may be described as constants in a program which runs on the relay server 102 to attain the same operations. Upon completion of the image list processing in steps S801 to S804, the MFP 101 executes thumbnail image processing in steps S805 and S806.

The thumbnail image processing in the MFP 101 will be described below. In order to select an image registered in the designated album, the MFP 101 displays a thumbnail image of a first image on the display unit 206. For this purpose, the MFP 101 issues an HTTP Get request of a thumbnail image designated from the received image information list to the site in step S805. The MFP 101 acquires thumbnail image data from that site, and displays an image to be selected on the display unit 206 in step S806. The MFP 101 repeats acquisition based on the URL of thumbnail image data described in the previously acquired image information list every time an image to be selected is switched and displayed.

In this embodiment, thumbnail image data is compressed in a JPEG format. The MFP 101 converts thumbnail image data stored in the RAM 204 into an RGB RAW format using the compression/decompression unit 211, and holds the converted image data in the RAM 204. Furthermore, the MFP 101 converts the number of pixels (to enlarge/reduce an image) using the image processing unit 210 to fit the image display area, and stores the converted image data in the RAM 204. The MFP 101 displays the enlarged/reduced image data on the display unit 206.

In this case, as the enlargement/reduction method, a nearest neighbor method, bilinear method, or the like may be used. Even with any method, when the number of pixels is increased by enlarging image data having the small number of pixels, image deterioration appears. For example, when image data is enlarged using the nearest neighbor method, an image on which so-called jaggies stand out is formed. On the other hand, when image data is enlarged using the bilinear method, an image which seems blurred due to lost sharpness is formed. Such image deterioration becomes more conspicuous with increasing enlargement factor. Therefore, it is not preferable to set a large enlargement factor in terms of display image quality. Various other bitmap image enlargement/reduction methods are available, but it is generally known that image deterioration becomes more conspicuous with increasing enlargement factor.

The image processing unit 210 can apply reduction processing to image data having the large number of pixels. However, image data size tends to increase with an increasing number of pixels. Therefore, the time required to acquire a thumbnail image and that required for the reduction processing are unwantedly prolonged.

When a display instruction of another thumbnail image is input by a user operation, the MFP 101 repetitively executes the thumbnail image display processing in steps S805 and S806. When a print image is specified by a print instruction execution operation by the user in step S807, the MFP 101 executes print image acquisition processing in steps S808 and S809. In order to acquire the designated print image data, the MFP 101 issues an HTTP Get request in step S808, and acquires the print image data from the site in step S809. Upon completion of the print image acquisition processing, the MFP 101 expands the acquired print image data and executes print processing in step S810.

As described above, the image list request issued by the MFP 101 includes the parameter which represents the image display area of the MFP 101. The relay server 102 receives the parameter that represents the image display area from the MFP 101, and decides the size of thumbnail image data to be acquired by the MFP 101.

When the MFP 101 operates in the full-screen display mode, since the display size has the width of 320 pixels and height of 240 pixels, the image list request includes these values as parameters. In this case, when the site A is selected as the photo sharing site, the relay server 102 acquires URLs of image data having widths of 512 pixels, 288 pixels, 144 pixels, and 72 pixels as thumbnail image data that can be acquired. In order to select image data having a width closest to 320 pixels, the relay server 102 calculates absolute values of differences from 320 pixels. In this example, absolute values of 192 pixels, 32 pixels, 176 pixels, and 248 pixels are calculated respectively for the four images. Of these values, the smallest absolute value assumes 32 pixels, and thumbnail image data having the width of 288 pixels corresponds to this value. The relay server 102 transmits a response including a URL of image data having the width of 288 pixels to the MFP 101.

When the site B is selected as the photo sharing site, the relay server 102 acquires URLs of image data having widths of 512 pixels and 100 pixels as thumbnail images that can be acquired. In order to select image data having a width closest to 320 pixels, the relay server 102 calculates absolute values of differences from 320 pixels. In this example, absolute values of 192 pixels and 220 pixels are calculated respectively for the two images. Of these values, the smallest absolute value assumes 192 pixels, and thumbnail image data having the width of 512 pixels corresponds to this value. The relay server 102 transmits a response including a URL of image data having the width of 512 pixels to the MFP 101.

In this embodiment, thumbnail image data having the smallest absolute value of the difference is selected with reference to the number of pixels of the width. However, the number of pixels of the height or the total number of pixels may be used as a reference. In place of the absolute value of the difference, a ratio may be used as a reference. In this embodiment, as shown in FIG. 11, the relay server 102 cannot acquire the number of pixels of a height for the site B. That is, as for the site B, the number of pixels of the width is used as a reference. However, when the specification of the photo sharing site B is changed, and the number of pixels of the height can be newly acquired, the configuration of the relay server 102 may be changed to use the number of pixels of the height or the total number of pixels as a reference.

As described above, the relay server 102 selects an image according to the size of the image display area where the image is displayed on the MFP 101 from those having a plurality of sizes stored in the photo sharing site. Hence, image data having a size most suited to the MFP 101 can be selected from those provided by the photo sharing site, and can be displayed on the MFP 101.

Furthermore, in this embodiment, the relay server selects an image according to the image display area of the client device (MFP), as described above. That is, the MFP can acquire an image of an appropriate size by notifying the relay server of the image display area. For this reason, even when the numbers of pixels of thumbnail image data provided by the photo sharing site or the API specifications are changed, or when a new photo sharing site is added, optimal thumbnail image data can be selected without changing software of the MFP 101.

Note that the present invention is not limited to the case in which the size of thumbnail image data is decided upon displaying a thumbnail image, as described above. For example, when an image is printed in step S810, the size of an image to be printed may be selected. In this case, the resolution of the printing device used to print an image is transmitted to as a print performance of the printing device upon issuance of a print image request in step S808. Then, the photo sharing site may transmit an image according to that resolution to the MFP 101 in step S809.

At this time, the size of an image print region on which an image is printed of a print medium may be transmitted, and an image having a size according to that size may be acquired. In order to determine the size of the image print region, for example, the MFP 101 transmits a paper size on which an image is printed, and a print mode to the photo sharing site. The photo sharing site can determine the size of the image print region based on that paper size and print mode. The print mode includes an index print mode which prints a plurality of images in a given pattern, and a borderless print mode which prints an image on a print sheet without forming any borders.

In the borderless print mode, an image larger than a paper size is printed to prevent blanks from being formed on a paper sheet. Hence, the photo sharing site decides an image larger than the paper size as a print target, and transmits that image to the MFP.

As in the aforementioned embodiment, an image according to an output size upon outputting an image by an output device is selected from images having a plurality of sizes stored in a server based on the output performance of the output device which outputs an image. In this way, an image having an appropriate size can be provided from the server to the output device, which can output that image.

Note that in the aforementioned embodiment, the relay server decides an image to be output. Alternatively, the client device may decide an image. In this case, the client device acquires the sizes of a plurality of images stored in the server, and selects an image to be acquired from the server according to its own output performance (display resolution, print resolution, etc.) and output mode. Then, the client device can request the server to transmit the selected image.

In place of the relay server, the server which stores a plurality of images may select an image to be provided to the client. In this case, the server acquires an output performance from the client device, and selects an image according to the output performance from a plurality of images stored in itself.

The above embodiment has exemplified the case in which an image to be output is selected from a plurality of images having different sizes. However, the present invention is not limited to this. For example, monochrome and color images may be stored in the server, and an image to be printed may be provided to the client device depending on whether a printing device used to print an image is a monochrome or color printer.

In the aforementioned embodiment, the output performance of the output device is judged based on the number of pixels of an image output area. However, the present invention is not limited to this. For example, a table which associates model names of output devices and image sizes corresponding to these devices is prepared in advance. Then, a model name of an output device may be acquired as an output performance, and an image having an image size corresponding to that model may be selected as that to be output to the device.

In the aforementioned embodiment, a plurality of Web servers respectively provide Web services. The present invention is also applicable to a system in which one Web server provides a plurality of Web services. That server is set to have a plurality of access destinations (for example, URLs), and provides different services depending on the access destinations.

Furthermore, the present invention is not limited to the case in which one server stores images of a plurality of sizes, as shown in FIG. 4. For example, a plurality of images may be stored in a plurality of servers (for example, these plurality of images are stored in corresponding servers).

Moreover, according to the above embodiment, the MFP has been exemplified as the client device which communicates with the Web servers. The present invention is not limited to such specific client device. For example, a PC, mobile phone, or digital camera may be used as the client device.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-161368, filed Jul. 22, 2011, which is hereby incorporated by reference herein in its entirety.

What is claimed is:

1. An information processing system comprising:
an output device configured to output an image; and
a relay server configured to communicate with the output device and one or more web servers which are different from the relay server and which store a plurality of images,
wherein the relay server comprises:
an acquisition unit that acquires size information which corresponds to sizes of the plurality of images from the one or more web servers, wherein the size information does not include the plurality of images;
a receiving unit that receives performance information corresponding to an output performance of the output device from the output device; and
a transmission unit that transmits, to the output device, location information indicating a storing location of an image, among the plurality of images, having a size corresponding to the output performance in the one or more web servers, based on the size information and the performance information,
wherein the output device acquires the image from the storing location indicated by the location information transmitted from the relay server, by communication with the one or more web servers without communicating with the relay server.

2. The information processing system according to claim 1, wherein the relay server acquires the size information from a web server of the one or more web servers, which responds to a request from the relay server.

3. The information processing system according to claim 1, wherein the output performance is a display performance of the output device.

4. An information processing method executed in an information processing system comprising an output device configured to output an image and a relay server configured to communicate with the output device and one or more web servers which are different from the relay server and which store a plurality of images, the method comprising:
acquiring by the relay server from the one or more servers, size information which corresponds to sizes of the plurality of images, where the size information does not include the plurality of images;
receiving, by the relay server from the output device, performance information corresponding to an output performance of the output device;
transmitting, by the relay server to the output device, location information indicating a storing location of an image, among the plurality of images, having a size corresponding to the output performance in the one or more servers, based on the size information and the performance information; and
acquiring, by the output device, the image from the storing location indicated by the location information transmitted from the relay server, by communication with the one or more web servers without communicating with the relay server.

5. A non-transitory computer-readable storage medium storing a program for controlling an information processing system comprising an output device configured to output an image and a relay server configured to communicate with the output device and one or more web servers which are different from the relay server and which store a plurality of images, apparatus to execute:
acquiring, by the relay server from the one or more servers, size information which corresponds to sizes of the plurality of images, where the size information does not include the plurality of images;
receiving, by the relay server from the output device, performance information corresponding to an output performance of the output device;
transmitting, by the relay server to the output device, location information indicating a storing location of an image, among the plurality of images, having a size corresponding to the output performance in the one or more servers, based on the size information and the performance information; and
acquiring, by the output device, the image from the storing location indicated by the location information transmitted from the relay server, by communication with the one or more web servers without communicating with the relay server.

6. The information processing system according to claim 3, wherein the output performance includes a size of a display area in which the image is to be displayed by the output device.

7. The information processing system according to claim 6, wherein the output performance further includes a display mode corresponding to the size of the display area.

8. The information processing system according to claim 1, wherein the output performance includes a device type of the output device.

9. The information processing system according to claim 1, wherein the relay server further acquires location information indicating a location corresponding to each of the plurality of images, and transmits the location information which is acquired by and corresponds to the image having the size corresponding to the output performance.

10. The information processing system according to claim 1, wherein the output performance includes a printing performance of the output device.

11. The information processing system according to claim 1, wherein respective ones of the plurality of images indicate a same content, and have different sizes.

12. The information processing system according to claim 1, wherein the output device is a printer.

13. The information processing system according to claim 1, wherein the relay server further receives an output request from the output device, and the relay server transmits the image location information to the output device in a case where the relay server receives the output request.

* * * * *